United States Patent
Tahara et al.

(10) Patent No.: US 10,621,418 B2
(45) Date of Patent: Apr. 14, 2020

(54) PASSENGER DETECTION DEVICE, PASSENGER DETECTION SYSTEM, AND PASSENGER DETECTION METHOD

(71) Applicant: Mitsubishi Electric Corporation, Tokyo (JP)

(72) Inventors: Natsuki Tahara, Tokyo (JP); Takashi Hirano, Tokyo (JP); Masanobu Osawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 81 days.

(21) Appl. No.: 16/070,192

(22) PCT Filed: Feb. 18, 2016

(86) PCT No.: PCT/JP2016/054729
§ 371 (c)(1),
(2) Date: Jul. 13, 2018

(87) PCT Pub. No.: WO2017/141401
PCT Pub. Date: Aug. 24, 2017

(65) Prior Publication Data
US 2019/0026540 A1   Jan. 24, 2019

(51) Int. Cl.
*G06K 9/00* (2006.01)
*G06K 9/32* (2006.01)
(Continued)

(52) U.S. Cl.
CPC ..... *G06K 9/00281* (2013.01); *G06K 9/00228* (2013.01); *G06K 9/00255* (2013.01);
(Continued)

(58) Field of Classification Search
CPC ........... G06K 9/00281; G06K 9/00228; G06K 9/00255; G06K 9/00275; G06K 9/00832;
(Continued)

(56) References Cited

U.S. PATENT DOCUMENTS 6,152,563 A * 11/2000 Hutchinson ............ A61B 3/113
351/209
8,208,027 B2    6/2012 Shimura
(Continued)

FOREIGN PATENT DOCUMENTS

JP    2004-70514 A    3/2004

OTHER PUBLICATIONS

Office Action dated Jul. 22, 2019 issued in corresponding German Application No. 11 2016 005 939.6.

*Primary Examiner* — David F Dunphy
(74) *Attorney, Agent, or Firm* — Birch, Stewart, Kolasch & Birch, LLP

(57) ABSTRACT

A passenger detection device (10) includes a face image obtaining unit (12) obtaining a face image captured in a state in which a passenger in a vehicle irradiated with irradiation light from light sources. The device further includes: a reflected-image position detecting unit (14) detecting, from the face image, positions of respective reflected images of the light sources reflected on eyeglasses worn by the passenger; an eyeglasses feature detecting unit (15) detecting, from the face image, positions of center points of lenses as feature information of the eyeglasses; a head position detecting unit (16) detecting a head position of the passenger on the basis of the positions of respective reflected images; and a face orientation detecting unit (17) detecting face orientation of the passenger on the basis of relation between the head position of the passenger, the positions of respective reflected images, and the positions of center points of lenses.

10 Claims, 14 Drawing Sheets

(51) Int. Cl.
*B60R 21/015* (2006.01)
*G06K 9/46* (2006.01)
*G06K 9/20* (2006.01)

(52) U.S. Cl.
CPC ..... *G06K 9/00275* (2013.01); *G06K 9/00832* (2013.01); *G06K 9/00838* (2013.01); *G06K 9/3208* (2013.01); *G06K 9/4661* (2013.01); *B60R 21/01534* (2014.10); *B60R 21/01538* (2014.10); *B60R 21/01552* (2014.10); *G06K 9/2018* (2013.01)

(58) Field of Classification Search
CPC . G06K 9/00838; G06K 9/3208; G06K 9/4661
See application file for complete search history.

(56) References Cited

U.S. PATENT DOCUMENTS

| | | | |
|---|---|---|---|
| 2007/0291231 A1 | 12/2007 | Hammoud et al. | |
| 2008/0285801 A1* | 11/2008 | Heinzmann | G06K 9/00281 382/103 |
| 2016/0103485 A1* | 4/2016 | Kim | G06T 7/73 382/118 |
| 2016/0162735 A1* | 6/2016 | Yoon, II | G06K 9/00604 382/103 |
| 2018/0239975 A1* | 8/2018 | Tamrakar | G06K 9/00845 |

* cited by examiner

FIG. 2A
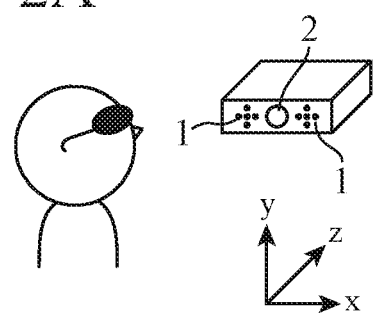
FIG. 2B  FIG. 2C  FIG. 2D  FIG. 2E
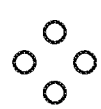 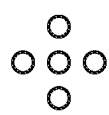 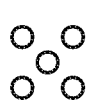 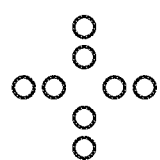

FIG. 5A      FIG. 5B      FIG. 5C
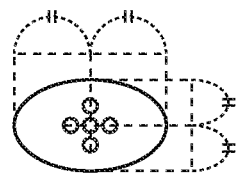 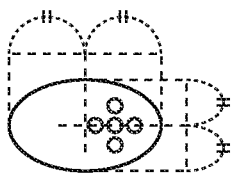 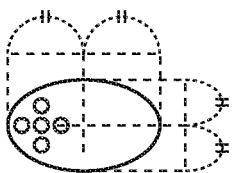
FIG. 5D      FIG. 5E      FIG. 5F
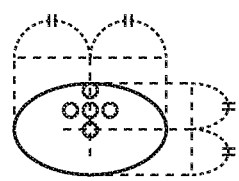 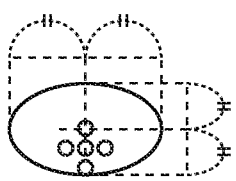 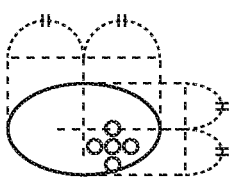
FIG. 6
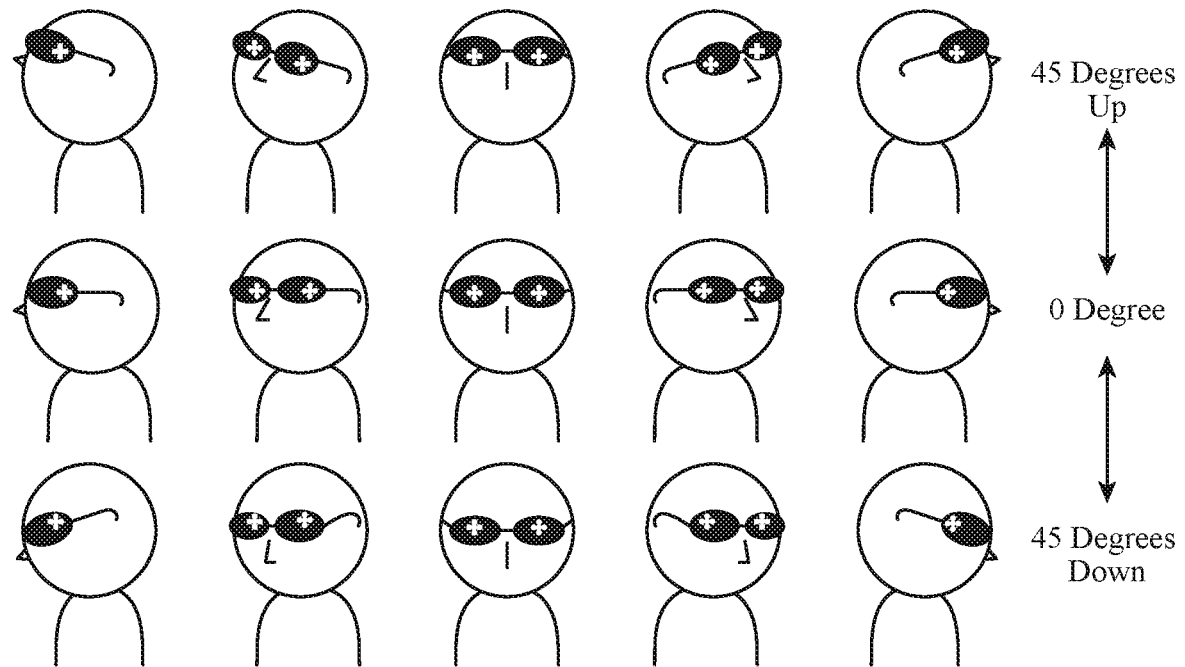

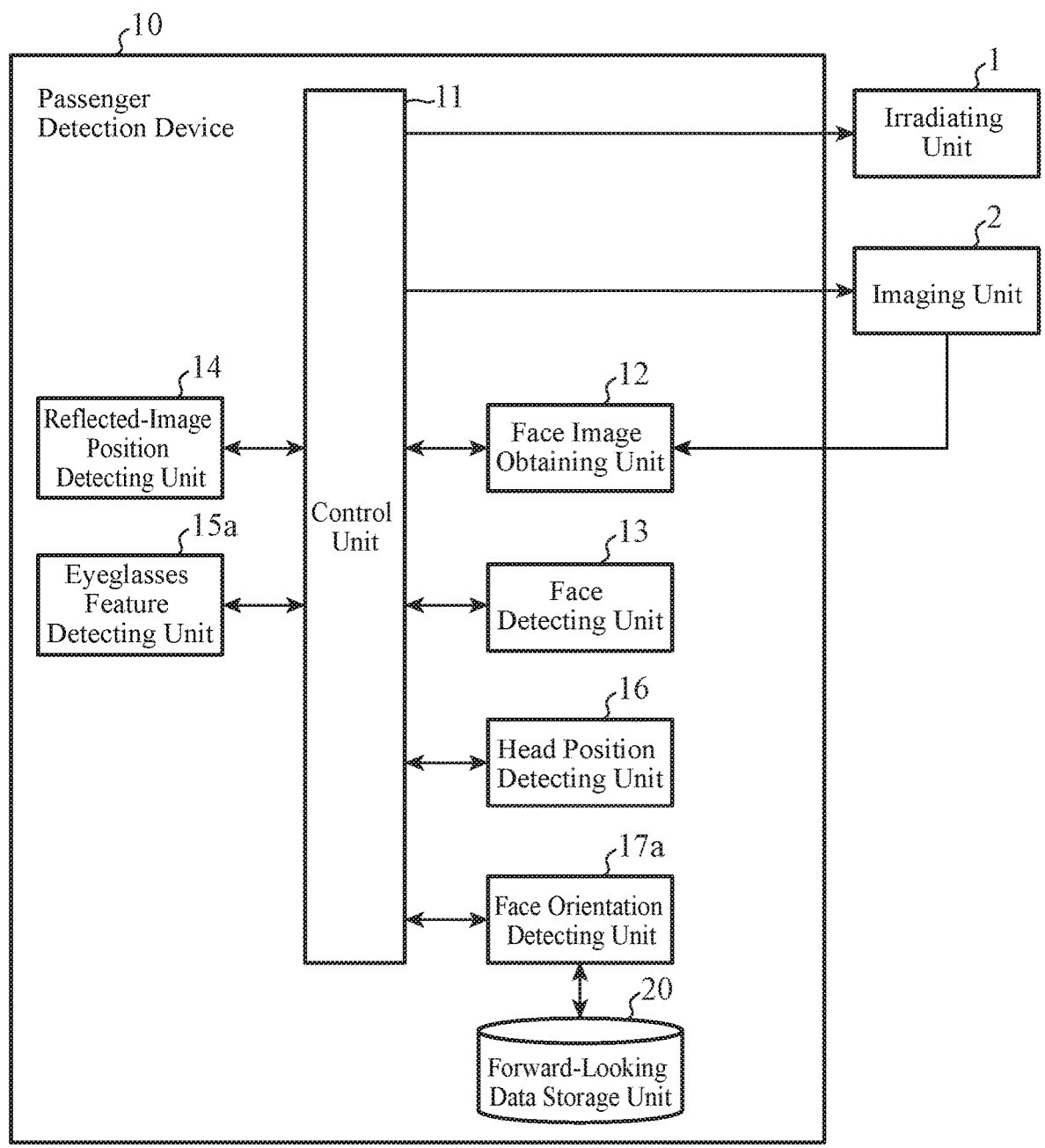

FIG. 11
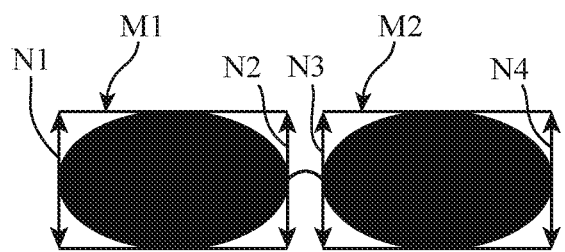
FIG. 12A   FIG. 12B   FIG. 12C
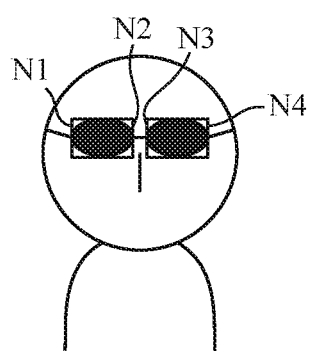 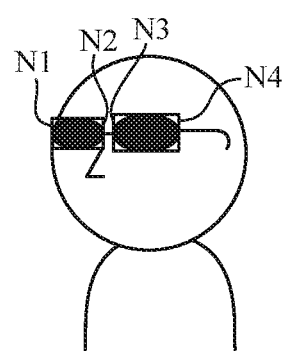 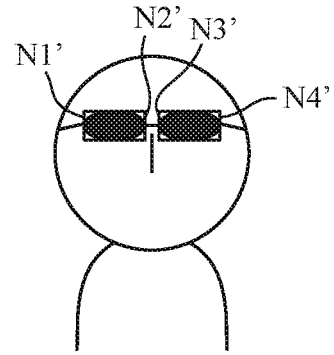

PASSENGER DETECTION DEVICE, PASSENGER DETECTION SYSTEM, AND PASSENGER DETECTION METHOD

TECHNICAL FIELD

The invention relates to a passenger detection device, a passenger detection system, and a passenger detection method for detecting face orientation of a passenger in a vehicle.

BACKGROUND ART

A conventional driver sensing device that detects the face orientation of a passenger has a problem that, when the passenger wears eyeglasses or sunglasses, feature points of the face cannot be detected and thus the face orientation cannot be detected. Thus, in Patent Literature 1, a face state detecting device is proposed that detects the face orientation on the basis of images of vehicle body structures reflected on the lenses of the eyeglasses, etc., worn by a passenger and the positions of the images.

CITATION LIST

Patent Literatures

Patent Literature 1: JP 2004-70514 A

SUMMARY OF INVENTION

Technical Problem

The face state detecting device according to Patent Literature 1 is configured in the above-described manner and thus has a problem that, when reflected images do not appear on the lenses of eyeglasses, etc., at night with no outside light, in a cloudy day, or the like, the face orientation cannot be detected. In addition, there is another problem that since extraction of images of vehicle body structures reflected on the lenses is performed by image processing, a high-quality camera is required, resulting in high cost.

The present invention is made to solve the above problems, and an object of the invention is to detect the face orientation of a passenger always at low cost without being affected by the time, weather, and the like.

Solution to Problem

A passenger detection device according to the invention includes: a face image obtaining unit obtaining a face image of a passenger in a vehicle, the face image being captured in a state in which the passenger is irradiated with irradiation light from a plurality of light sources; a reflected-image position detecting unit detecting positions of respective reflected images of the plurality of light sources from the face image obtained by the face image obtaining unit, the reflected images being reflected on eyeglasses worn by the passenger; an eyeglasses feature detecting unit detecting, from the face image obtained by the face image obtaining unit, feature information indicating a position or shape of the eyeglasses which corresponds to face orientation of the passenger; a head position detecting unit detecting a head position of the passenger on a basis of the positions of respective reflected images detected by the reflected-image position detecting unit; and a face orientation detecting unit detecting face orientation of the passenger on a basis of the head position of the passenger detected by the head position detecting unit, the positions of respective reflected images detected by the reflected-image position detecting unit, and the feature information of the eyeglasses detected by the eyeglasses feature detecting unit.

Advantageous Effects of Invention

According to the invention, the face orientation of a passenger in a vehicle is detected using a face image captured in a state in which the passenger is irradiated with an irradiation light from a plurality of light sources, and thus, the face orientation of the passenger can always be detected at low cost without being affected by the time, weather, and the like.

BRIEF DESCRIPTION OF DRAWINGS

FIG. 2A is a diagram exemplifying a positional relation among irradiating units, an imaging unit, and a passenger of the first embodiment, and FIGS. 2B to 2E are diagrams showing exemplary arrangements of a plurality of light sources included in an irradiating unit;

FIGS. 5A to 5F are diagrams for explaining a positional relation between a lens of eyeglasses and reflected images appeared on the lens;

FIG. 6 is a diagram showing the positions of reflected images reflected on eyeglasses lenses when a passenger wearing eyeglasses orients his/her face in various directions;

FIG. 9 is a block diagram showing an exemplary configuration of a passenger detection system according to a second embodiment of the invention;

FIG. 11 is a diagram for explaining the shapes of eyeglasses lenses of the second embodiment;

FIGS. 12A, 12B, and 12C are diagrams for explaining a method of detecting the face orientation performed by the passenger detection device according to the second embodiment;

DESCRIPTION OF EMBODIMENTS

To describe the invention in more detail, some embodiments of the present invention will be described below with reference to the accompanying drawings.

First Embodiment

Figure 1:
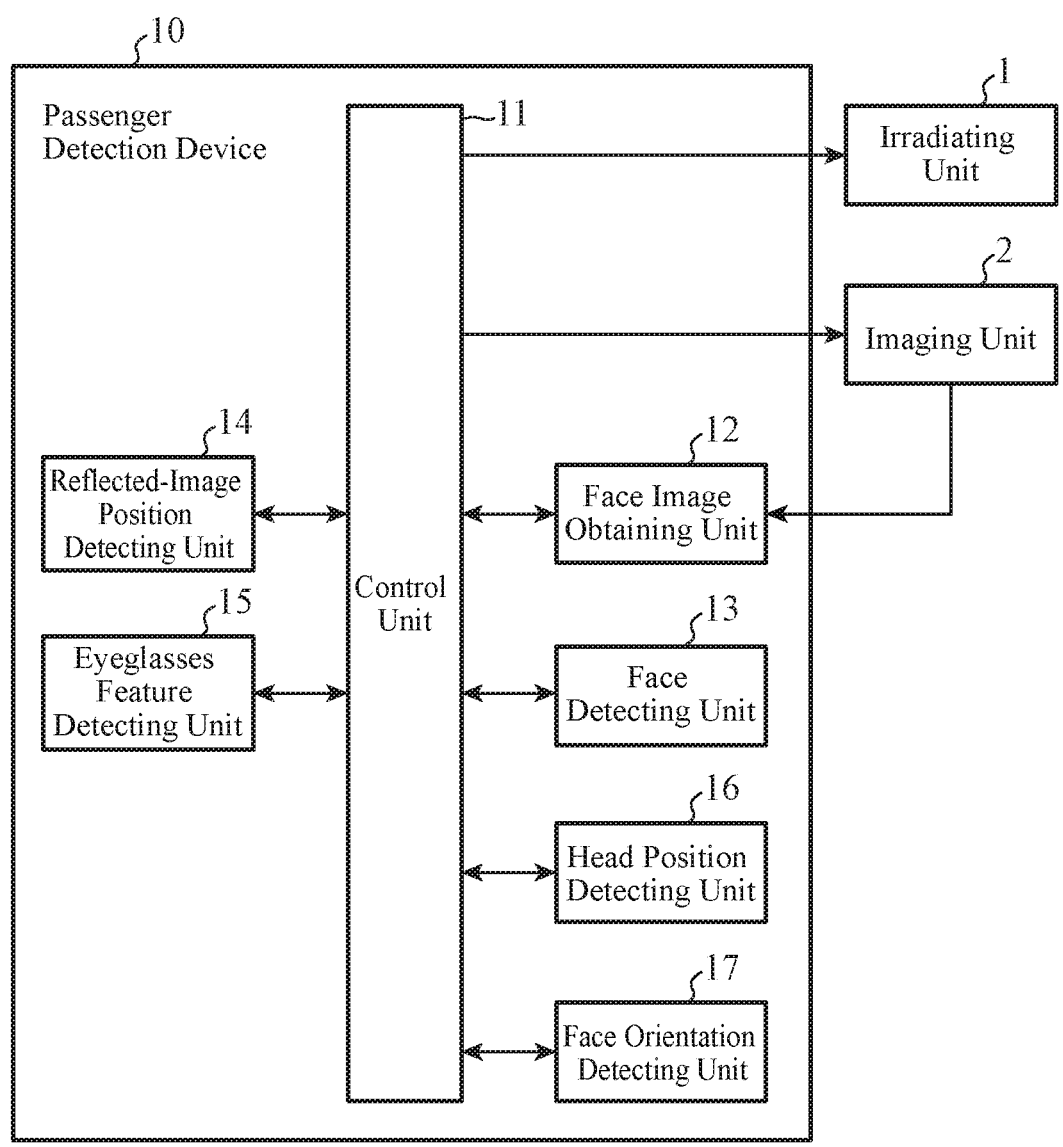
FIG. 1 is a block diagram showing an exemplary configuration of a passenger detection system according to a first embodiment of the invention.

FIG. 1 is a block diagram showing an exemplary configuration of a passenger detection system according to a first embodiment of the invention. The passenger detection system shown in FIG. 1 includes an irradiating unit 1, an imaging unit 2, and a passenger detection device 10. In each of the following embodiments of the invention, an example of a passenger detection system mounted on an automobile is explained. Alternatively, the passenger detection system can be mounted on a vehicle such as a railway vehicle, a ship, an aircraft, or the like.

The irradiating unit 1 includes a plurality of light sources. The irradiating unit 1 is installed in a vehicle interior in front of a passenger, and irradiates the passenger with irradiation light from the plurality of light sources.

The imaging unit 2 includes one or a plurality of cameras. The imaging unit 2 is installed in the vehicle interior, and captures an image of a passenger's face and outputs the image as a face image.

For example, light emitting diodes (LEDs) that irradiate visible light may be used as a light sources of the irradiating unit 1, and a camera having sensitivity in a range of visible light may be used as the imaging unit 2. Alternatively, LEDs that irradiate invisible light such as infrared rays may be used as the light sources of the irradiating unit 1, and a camera having sensitivity in a range of the invisible light may be used as the imaging unit 2. When invisible light LEDs are used, even if the passenger is subjected to irradiation at night, the passenger is not dazzled.

FIG. 2A shows an example of a positional relation among the irradiating units 1, the imaging unit 2, and a passenger. In the example of FIG. 2A, the irradiating units 1 and the imaging unit 2 are installed in front of a passenger. The two irradiating units 1, each including five light sources, are arranged on the left and right sides of the imaging unit 2.

In the example of FIG. 2A, visible light LEDs are used, and the two irradiating units 1 are installed on both sides of the imaging unit 2 so that a passenger's face is not shadowed. When infrared ray LEDs are used, only one irradiating unit 1 may be used.

Further, as shown in FIG. 2A, a single casing into which the irradiating units 1 and the imaging unit 2 are integrated may be formed, or a casing for the irradiating units 1 and a casing for the imaging unit 2 may be separated.

In the following, as shown in FIG. 2A, the horizontal direction is represented as the x-axis direction, the vertical direction is represented as the y-axis direction, and the depth direction is represented as the z-axis direction.

FIGS. 2B, 2C, 2D, and 2E are diagrams showing exemplary arrangements of a plurality of light sources included in an irradiating unit 1. An irradiating unit 1 shown in FIG. 2B is configured such that four light sources are arranged on up, down, left, and right side. An irradiating unit 1 shown in FIG. 2C is configured such that five light sources are arranged to form a cross shape. An irradiating unit 1 shown in FIG. 2D is configured such that five light sources are arranged to form an X shape. An irradiating unit 1 shown in FIG. 2E is configured such that eight light sources are arranged to form a cross shape.

As shown in the drawings, it is preferable for the irradiating unit 1 to form a characteristic arrangement such as a vertical line, a horizontal line, an oblique line, or a cross shape formed by a combination thereof, or a triangular shape, that allows to distinguish the irradiation light from the irradiating unit 1 from light other than the irradiation light upon reflection on eyeglasses lenses. For reference, light other than the irradiation light from the irradiating unit 1 includes, for example, external light from the outside of the vehicle, and external light reflected by a lens has a planar shape or a single point shape.

The passenger detection device 10 includes a control unit 11, a face image obtaining unit 12, a face detecting unit 13, a reflected-image position detecting unit 14, an eyeglasses feature detecting unit 15, a head position detecting unit 16, and a face orientation detecting unit 17. The passenger detection device 10 detects the face orientation of a passenger wearing eyeglasses in general, including eyeglasses for vision correction, sunglasses or goggles for eye protection, or the like.

The control unit 11 controls the operation of the irradiating unit 1, the imaging unit 2, and the passenger detection device 10. Specifically, the control unit 11 instructs the irradiating unit 1 to control the turning on and off of the plurality of light sources. Further, the control unit 11 instructs the imaging unit 2 to capture an image of the passenger being irradiated with irradiation light from the irradiating unit 1 with the camera. Moreover, the control unit 11 instructs the face image obtaining unit 12, the face detecting unit 13, the reflected-image position detecting unit 14, the eyeglasses feature detecting unit 15, the head position detecting unit 16, and the face orientation detecting unit 17 in the passenger detection device 10 to control the timing of operation or to control the receiving and outputting of information.

The face image obtaining unit 12 obtains a face image from the imaging unit 2 and outputs the face image to the control unit 11.

The face detecting unit 13 receives the face image from the imaging unit 2 through the control unit 11, detects a face from the face image, and outputs the face detection result to the control unit 11. The face detecting unit 13 is, for example, a classification unit using common algorithms such as Adaboost and Cascade. The passenger detection device 10 may not be configured to include the face detecting unit 13, and an external device such as the imaging unit 2 may be configured to include the face detecting unit 13. When an external device is configured to include the face detecting unit 13, the face image obtaining unit 12 obtains a face image and a face detection result from the face detecting unit 13 in the external device and outputs the face image and the face detection result to the control unit 11.

The reflected-image position detecting unit 14 receives the face image and the face detection result through the control unit 11 and detects reflected images which have the same shape as the arrangement of the irradiating unit 1 from within a face detection frame in the face image, the reflected images being reflected on lenses of eyeglasses worn by the passenger. For example, when the plurality of light sources of the irradiating unit 1 are arranged as shown in FIG. 2C, the reflected images reflected on the lenses of the eyeglasses in the face image also become a plurality of white dots such as those of FIG. 2C. It is assumed that information about the arrangement of the irradiating unit 1 to detect reflected images is given to the reflected-image position detecting unit 14 in advance. For detecting the reflected images, the reflected-image position detecting unit 14 may perform edge detection within the face detection frame or may perform a comparison among luminance values.

When the reflected-image position detecting unit 14 detects reflected images which have the same shape as the arrangement of the irradiating unit 1, the reflected-image position detecting unit 14 determines that the passenger wears eyeglasses, and detects the positions of the respective reflected images corresponding to the plurality of light sources of the irradiating unit 1. Then, the reflected-image position detecting unit 14 outputs the detection results of the positions of the respective reflected images to the control unit 11.

On the other hand, when the reflected-image position detecting unit 14 does not detects reflected images which have the same shape as the arrangement of the irradiating unit 1, the reflected-image position detecting unit 14 determines that the passenger does not wear eyeglasses, and outputs the determination result to the control unit 11.

The eyeglasses feature detecting unit 15 receives, through the control unit 11, the face image and the face detection result and detects lenses of the eyeglasses worn by the passenger or frames fixing the lenses from within the face detection frame in the face image. Then, the eyeglasses feature detecting unit 15 detects, using detection results of the lenses or frames, positions of the center points of lens shapes as feature information indicating the position of the eyeglasses corresponding to the face orientation of the passenger, and outputs the detection results to the control unit 11. To detect lenses or frames, the eyeglasses feature detecting unit 15 may perform edge detection within the face detection frame or may perform a comparison among luminance values.

Note that the reflected-image position detecting unit 14 and the eyeglasses feature detecting unit 15, for example, detect the positions of the respective reflected images and the positions of the center points of the lenses with reference to a coordinate system with x- and y-axes set in the face image.

The head position detecting unit 16 receives, through the control unit 11, the detection results of the positions of the respective reflected images, and determines distances between the reflected images from the positions of the respective reflected images and thereby detects a head position of the passenger. The head position detecting unit 16 outputs the detection result of the head position to the control unit 11. A method of detecting a head position will be described in detail later.

The face orientation detecting unit 17 detects the face orientation of the passenger, and has a function of detecting the face orientation for a case of a passenger wearing eyeglasses and a function of detecting the face orientation for a case of a passenger not wearing eyeglasses. However, the function of detecting face orientation for a case of the passenger not wearing eyeglasses may not be included.

When the passenger wears eyeglasses, the face orientation detecting unit 17 receives, through the control unit 11, the detection results of the positions of the respective reflected images, the positions of the center points of the lenses, and the head position, and detects the face orientation of the passenger on the basis of a positional relation among the reflected images, the center points of the lenses, and the head position. The face orientation detecting unit 17 outputs the detection result of the face orientation to the control unit 11. A method of detecting face orientation will be described in detail later.

When the passenger does not wear eyeglasses, the face orientation detecting unit 17 receives, through the control unit 11, the face image and the face detection result, detects the face orientation of the passenger, and outputs the detection result to the control unit 11. In this case, the face orientation detecting unit 17 detects the face orientation using a known technique and may, for example, perform detection of the face orientation by detecting feature points of the face corresponding to the eyes, nose, or mouth from within the face detection frame, or perform detection of the face orientation by image processing.

Figure 3:
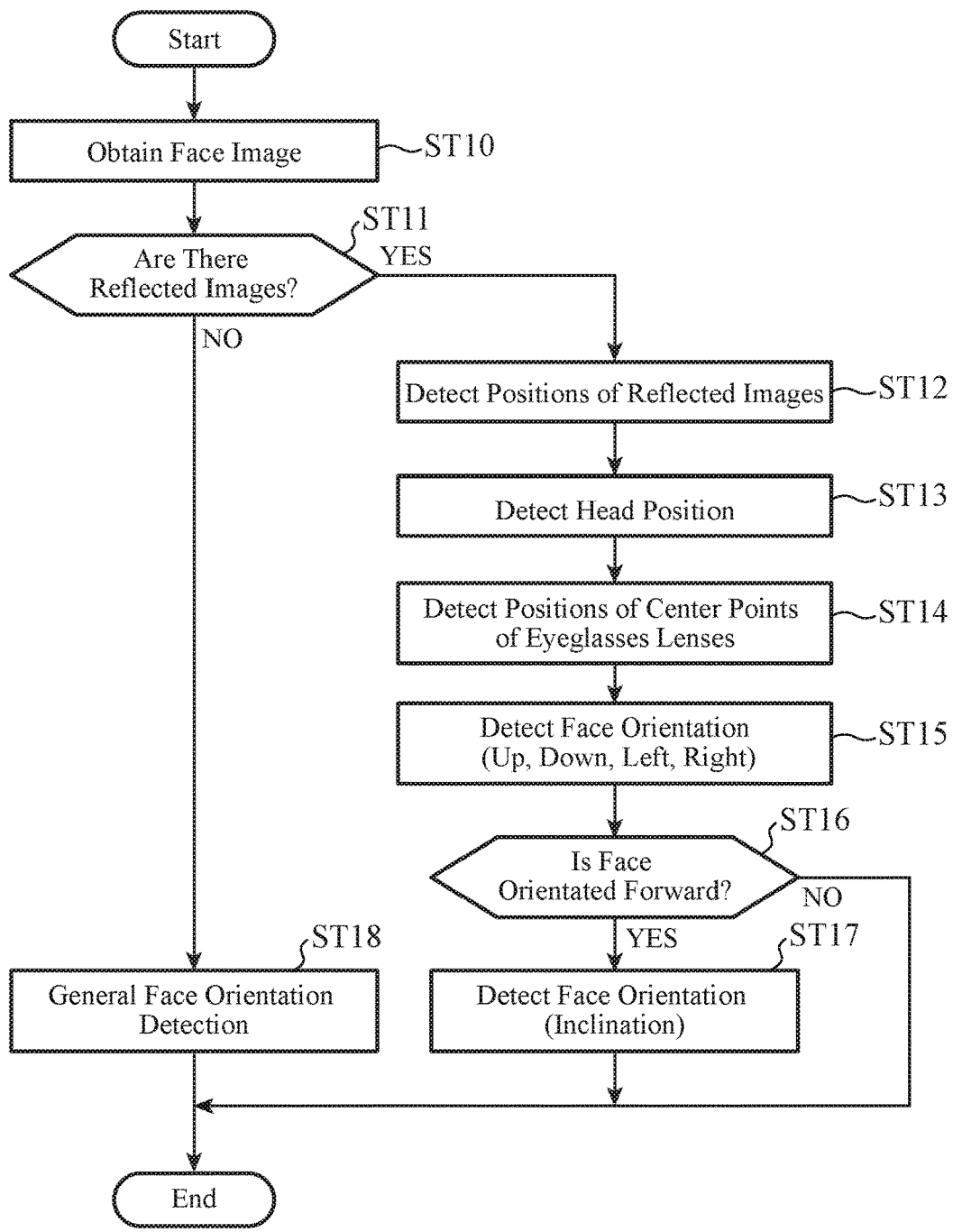
FIG. 3 is a flowchart showing an operation of a passenger detection device according to the first embodiment.

Next, with reference to the flowchart of FIG. 3, an operation of the passenger detection device 10 according to the present embodiment will be described. The passenger detection device 10 repeatedly performs processes in the flowchart shown in FIG. 3. In the following description, it is assumed that the irradiating unit 1 has five light sources arranged as shown in FIG. 2C.

At step ST10, the face image obtaining unit 12 obtains a face image captured by the imaging unit 2. The control unit 11 outputs the face image obtained by the face image obtaining unit 12 to the face detecting unit 13. The face detecting unit 13 detects a passenger's face from the face image received from the control unit 11, and outputs the face detection result to the control unit 11.

At step ST11, the reflected-image position detecting unit 14 receives the face image and the face detection result from the control unit 11 and detects reflected images which have the same shape as the arrangement of the irradiating unit 1 from within the face detection frame. If the reflected-image position detecting unit 14 detects reflected images which have the same shape as the arrangement of the irradiating unit 1 ("YES" at step ST11), the reflected-image position detecting unit 14 determines that the passenger wears eyeglasses, and proceeds to step ST12.

On the other hand, if the reflected-image position detecting unit 14 does not detect reflected images which have the same shape as the arrangement of the irradiating unit 1 ("NO" at step ST11), the reflected-image position detecting unit 14 determines that the passenger does not wear eyeglasses, and proceeds to step ST18.

At step ST12, the reflected-image position detecting unit 14 detects positions of the respective reflected images and outputs the detection results to the control unit 11.

At step ST13, the head position detecting unit 16 receives the detection results of the positions of the respective reflected images from the control unit 11, detects a head position of the passenger, and outputs the detection result to the control unit 11.

The coordinate value of the position of the head position in the horizontal direction (x-axis direction) and that in the vertical direction (y-axis direction) are calculated using the coordinate values (x, y) of the positions of the reflected images in the face image.

Further, the coordinate value of the position of the head in the depth direction (z-axis direction) is calculated using distances among the reflected images.

Now, a method for calculating the coordinate value of the position of the head in the depth direction will be described.

Figure 4A:
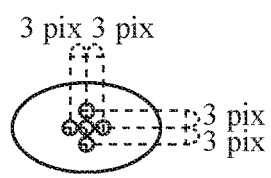
FIGS. 4A to 4C are diagrams for explaining a method of detecting a head position performed by the passenger detection device according to the first embodiment.
Figure 4B:
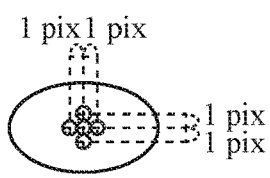
Figure 4C:
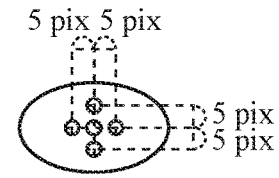

FIGS. 4A, 4B, and 4C are diagrams for explaining a method of detecting a head position, and show five reflected images reflected on an eyeglasses lens. For example, it is assumed that, when the distance between the passenger and the irradiating unit 1 is 80 cm, the distances among reflected images are three pixels, as shown in FIG. 4A. When the passenger moves forward and the passenger and the irradiating unit 1 get closer to each other to the distance of 70 cm, the distances among reflected images are, as shown in FIG. 4B, one pixel, namely, the spaces among the reflected images become narrower. On the other hand, when the passenger moves backward and the passenger and the irradiating unit 1 get away from each other to the distance of 90 cm, the distances among reflected images are, as shown in FIG. 4C, five pixels, namely, the spaces among the reflected images become wider. The head position detecting unit 16 calculates the coordinate value of the position of the head in the depth direction on the basis of the ratios between the actual distances among the plurality of light sources of the irradiating unit 1 and the distances among the reflected images detected from the face image.

At step ST14, the eyeglasses feature detecting unit 15 receives the face image and the face detection result from the control unit 11, detects positions of the center points of eyeglasses lenses from within the face detection frame, and outputs the detection results to the control unit 11.

At step ST15, the face orientation detecting unit 17 receives the detection results of the positions of the respective reflected images, the positions of the center points of the lenses, and the head position from the control unit 11, and first detects the vertical and horizontal face orientation of the passenger. Then, the face orientation detecting unit 17 outputs the detected horizontal angle and vertical angle of the face orientation to the control unit 11. Note that, when the passenger orients his/her face in the direction of the irradiating unit 1, i.e., when the horizontal angle of the face orientation is 0 degree and the vertical angle of the face orientation is 0 degree, the face orientation detecting unit 17 outputs the detected horizontal angle, vertical angle, and inclination angle of the face orientation to the control unit 11.

FIGS. 5A, 5B, 5C, 5D, 5E, and 5F are diagrams for explaining a positional relation between a lens of eyeglasses and reflected images reflected on the lens. FIG. 6 is a diagram showing positions of reflected images reflected on eyeglasses lenses when a passenger wearing eyeglasses orients his/her face in various directions.

Here, it is assumed that, when the passenger orients his/her face in the direction of the irradiating unit 1, i.e., when the horizontal angle and the vertical angle of the face orientation are 0 degrees, as shown in FIG. 5A, reflected images are located at the center point of the eyeglasses lens. When the passenger orients his/her face leftward with maintaining its vertical angle to be at 0 degree as viewed from the irradiating unit 1, i.e., when the leftward angle of the face orientation is 60 degrees, for example, and the vertical angle is 0 degree, as shown in FIG. 5B, reflected images are located on the right side from the center point of the eyeglasses lens. On the other hand, when the passenger orients his/her face rightward, i.e., when the rightward angle of the face orientation is 60 degrees, for example, and the vertical angle is 0 degree, as shown in FIG. 5C, reflected images are located on the left side from the center point of the eyeglasses lens.

When the passenger orients his/her face downward with maintaining its horizontal angle to be at 0 degree as viewed from the irradiating unit 1, i.e., when the horizontal angle of the face orientation is 0 degree and the downward angle is 30 degrees, for example, as shown in FIG. 5D, reflected images are located on the upper side from the center point of the eyeglasses lens. On the other hand, when the passenger orients his/her face upward, i.e., when the horizontal angle of the face orientation is 0 degree and the upward angle is 30 degrees, for example, as shown in FIG. 5E, reflected images are located on the lower side from the center point of the eyeglasses lens.

Further, when the passenger orients his/her face obliquely upward left, i.e., when the leftward angle of the face orientation is 60 degrees and the upward angle is 30 degrees, for example, as shown in FIG. 5F, reflected images are located on the obliquely downward right side from the center point of the eyeglasses lens. Likewise, when the passenger orients his/her face obliquely downward left, the positions of reflected images are in a combined state of FIGS. 5B and 5D and are obliquely upward right side from the center point of the lens, and when the passenger orients his/her face obliquely upward right, the positions of reflected images are in a combined state of FIGS. 5C and 5E and are obliquely downward left side from the center point of the lens.

Figure 7:
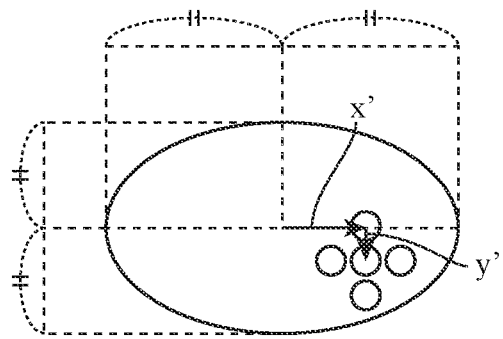
FIG. 7 is a diagram for explaining a method of detecting the horizontal angle and vertical angle of the face orientation performed by the passenger detection device according to the first embodiment.

FIG. 7 is a diagram for explaining a method of detecting the horizontal angle and vertical angle of the face orientation, and shows five reflected images reflected on an eyeglasses lens. x' is a distance (mm) from the center point of the eyeglasses lens to a reflected image in the horizontal direction (x-axis direction). y' is a distance (mm) from the center point of the eyeglasses lens to the reflected image in the vertical direction (y-axis direction).

The face orientation detecting unit 17 calculates the horizontal angle θx of the face orientation using equation (1), and calculates the vertical angle θy of the face orientation using equation (2).

$$\theta x = \sin^{-1}(wx \times z \times xp/R) = \sin^{-1}(x'/R) \qquad (1)$$

$$\theta y = \sin^{-1}(wy \times z \times yp/R) = \sin^{-1}(y'/R) \qquad (2)$$

Here, wx is a weight used when the units are converted from pixels in the horizontal direction (x-axis direction) that change in accordance with the depth direction z to the distance expressed in millimeters, xp is the distance (pixels) from the center point of the eyeglasses lens to a reflected image in the horizontal direction (x-axis direction), wy is a weight used when the units are converted from pixels in the vertical direction (y-axis direction) that change in accordance with the depth direction z to the distance expressed in millimeters, yp is the distance (pixels) from the center point of the eyeglasses lens to a reflected image in the vertical direction (y-axis direction), z is the distance (mm) from the irradiating unit 1 to the passenger's head in the depth direction (z-axis direction), and R is the radius (mm) of a typical human head and is a fixed value.

The inclination angle of the face orientation can be detected, only when the passenger orients his/her face toward the irradiating unit 1, i.e., only when the passenger orients his/her face forward.

At step ST16, when the passenger orients his/her face toward the irradiating unit 1, i.e., when the horizontal angle and the vertical angle of the face orientation are 0 degrees ("YES" at step ST16), the face orientation detecting unit 17 proceeds to step ST17 and detects the inclination angle of the face orientation. On the other hand, when the passenger does not orient his/her face toward the irradiating unit 1, i.e., when the horizontal angle or the vertical angle of the face orientation is other than 0 degree ("NO" at step ST16), the face orientation detecting unit 17 ends the process. Note that the face orientation detecting unit 17 does not need to determine whether the horizontal angle and vertical angle of the face orientation are precisely 0 degree, and may determine whether those angles are in a predetermined range including 0 degree.

At step ST17, the face orientation detecting unit 17 detects the inclination angle of the face orientation by comparing the coordinate values of the positions in the vertical direction of the respective reflected images reflected on the eyeglasses lenses, and outputs the detection result of the inclination angle of the face orientation to the control unit 11.

Figure 8A:
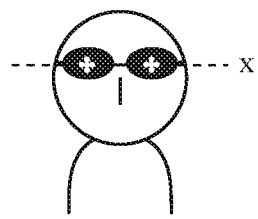
FIGS. 8A and 8B are diagrams for explaining a method of detecting an inclination angle of the face orientation performed by the passenger detection device according to the first embodiment.
Figure 8B:
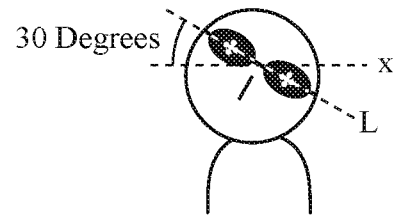

FIGS. 8A and 8B are views for explaining a method of detecting an inclination angle of the face orientation. FIG. 8A shows a passenger whose face orientation is as follows: the horizontal angle is 0 degree, the vertical angle is 0 degree, and the inclination angle is 0 degree. FIG. 8B shows a passenger whose face orientation is as follows: the horizontal angle is 0 degree, the vertical angle is 0 degree, and the left inclination angle is 30 degrees.

It is assumed that the information about the arrangement of the irradiating unit 1 indicating that, in the five light sources shown in FIG. 2C, three light sources including the center one and both the left side and right side ones are arranged in a straight line in the horizontal direction, is provided to the face orientation detecting unit 17 in advance.

The face orientation detecting unit 17 determines that the inclination angle of the face orientation is 0 degree when the coordinate values of the positions of respective reflected images of the above-described three light sources reflected on the eyeglasses lenses in the vertical direction are identical as shown in FIG. 8A, i.e., when the respective reflected images of the above-described three light sources are parallel to the x-axis extending in the horizontal direction. On the other hand, when the coordinate values of the positions of the respective reflected images of the above-described three light sources in the vertical direction are not identical as shown in FIG. 8B, the face orientation detecting unit 17 calculates the angle formed by the straight line L that connects the respective reflected images of the above-described three light sources and the x-axis in the horizontal direction, and determines the angle as the inclination angle of the face orientation.

By the processes at the above-described steps ST12 to ST17, the passenger detection device 10 detects the head position and the face orientation when the passenger wears eyeglasses. Note that the face orientation detecting unit 17 may only detect the face orientation which is one of the up, down, left, or right direction, or may also detect the angle in addition to such an orientation.

On the other hand, when the passenger does not wear eyeglasses, the passenger detection device 10 detects the face orientation of the passenger in a process at step ST18. At this step ST18, the face orientation detecting unit 17 receives, through the control unit 11, the face image and the face detection result, detects the face orientation by a known technique, and outputs the detection result to the control unit 11.

As described above, the passenger detection device 10 according to the first embodiment includes: a face image obtaining unit 12 obtaining a face image of a passenger in a vehicle, the face image being captured in a state in which the passenger is irradiated with irradiation light from a plurality of light sources; a reflected-image position detecting unit 14 detecting positions of respective reflected images of the plurality of light sources from the face image obtained by the face image obtaining unit 12, the reflected images being reflected on eyeglasses worn by the passenger; an eyeglasses feature detecting unit 15 detecting, from the face image obtained by the face image obtaining unit 12, a position of a center point of a lens as feature information of an eyeglasses; a head position detecting unit 16 detecting a head position of the passenger on a basis of the positions of respective reflected images detected by the reflected-image position detecting unit 14; and a face orientation detecting unit 17 detecting face orientation of the passenger on a basis of a relation among the head position of the passenger detected by the head position detecting unit 16, the positions of respective reflected images detected by the reflected-image position detecting unit 14, and the position of the center point of the lens detected by the eyeglasses feature detecting unit 15. According to this configuration, outside light is not used but irradiation light which is irradiated from a plurality of light sources is used, and thus, the face orientation of a passenger can always be detected without being affected by time, weather, and the like. In addition, there is no need to perform high-precision image processing for extracting vehicle body structures reflected on eyeglasses lenses like a conventional case, and it is enough for the image processing to detect reflected images that appear as images of white dots on a face image, and thus, a high-performance camera is not required, and the face orientation detection can be performed at low cost.

In addition, according to the first embodiment, the irradiating unit 1 is configured to have a plurality of light sources arranged in any of the vertical, horizontal, and oblique lines. There are the following four advantages in arranging the plurality of light sources included in the irradiating unit 1 in a characteristic shape as described above.

The first advantage is that it becomes easier to distinguish reflected images of outside light reflected on eyeglasses lenses and reflected images of the irradiating unit 1. The reflected images of outside light reflected on the eyeglasses lenses almost never form the characteristic shapes such as those shown in FIGS. 2B to 2E and the like. Hence, by arranging the irradiating unit 1 in a characteristic shape, the probability that reflected images of outside light are erroneously identified as reflected images of the irradiating unit 1 is decreased.

The second advantage is that high-precision image processing becomes unnecessary. In the invention according to Patent Literature 1 described before, for extracting vehicle body structures reflected on lenses by image processing, it is required to perform high-precision image processing using a high-quality captured image. On the other hand, in the present embodiment, since reflected images of a characteristic shape such as that of the irradiating unit 1 are detected from within a face detection frame, a camera that captures a high-quality image is not required and the image processing time can be reduced.

The third advantage is that even if a monocular camera is used as the imaging unit 2, the distance in the depth direction (z-axis direction) of the head position can be detected. Conventionally, detection of the distance in the depth direction of the head position requires the use of a stereo camera or a Time-of-Flight camera that detects a distance on the basis of the arrival speed of laser light, and it is difficult to detect the distance by a monocular camera. On the other hand, in the present embodiment, by arranging a plurality of light sources as the irradiating unit 1, the distance in the depth direction from the irradiating unit 1 to the passenger can be calculated on the basis of the distances between reflected images.

The fourth advantage is that the inclination angle of a face orientation when the passenger faces forward, i.e., when the passenger orients his/her face in the direction of the irradiating unit 1, can be detected. When the irradiating unit 1 is composed of one light source, only the horizontal angle and vertical angle of the face orientation can be detected. On the other hand, when the irradiating unit 1 is composed of a plurality of light sources arranged in the horizontal direction, the inclination angle of the face orientation can be detected.

Second Embodiment

In the above-described first embodiment, the positions of the center points of lenses are detected as eyeglasses feature information. On the other hand, in this second embodiment, the shapes of lenses or frames are detected as eyeglasses feature information.

FIG. 9 is a block diagram showing an exemplary configuration of a passenger detection system according to the second embodiment of the invention. In FIG. 9, the same or corresponding portions to those in FIG. 1 are denoted by the same reference signs and description thereof is omitted.

Figure 10:
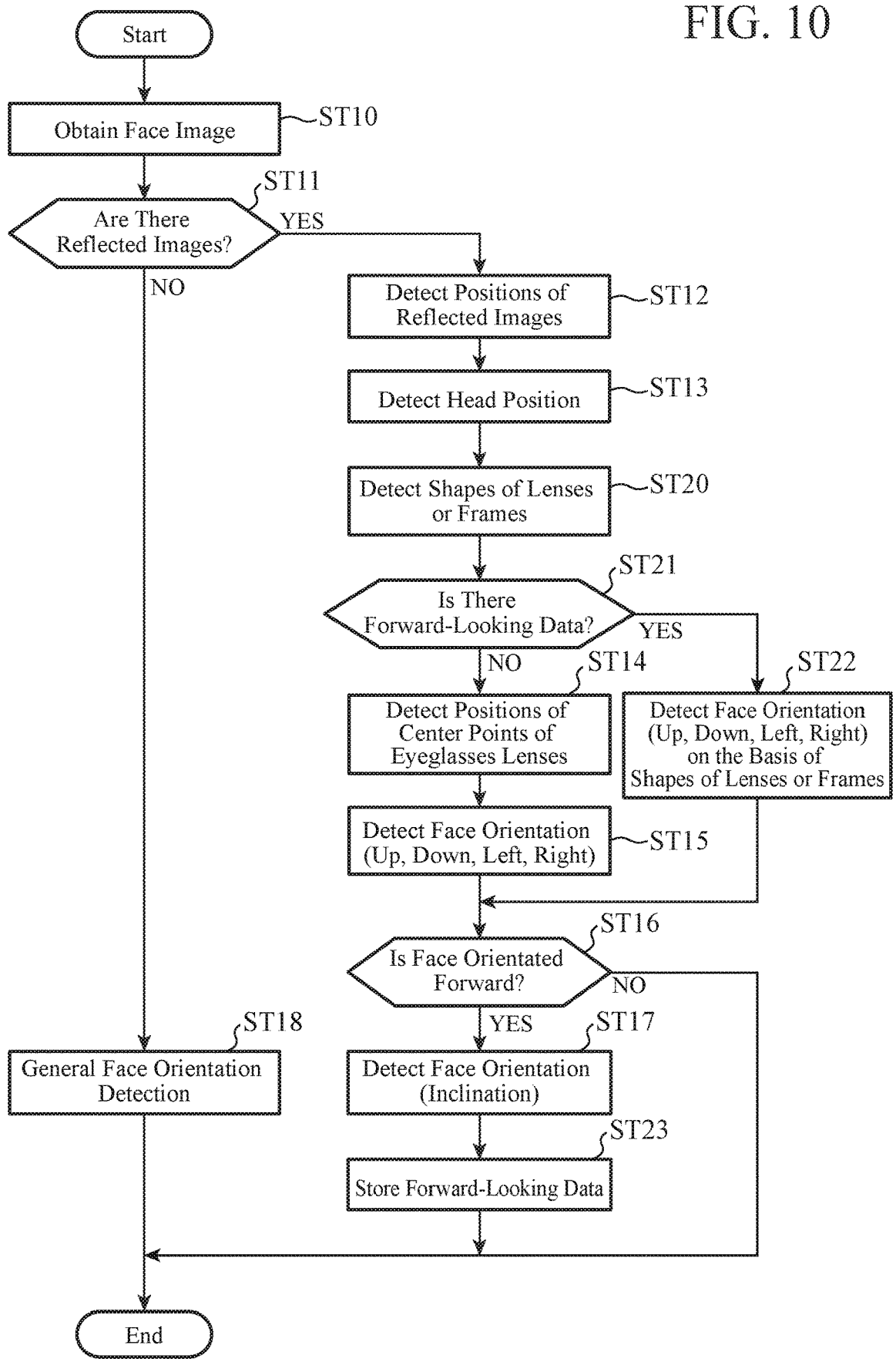
FIG. 10 is a flowchart showing an operation of a passenger detection device according to the second embodiment.

FIG. 10 is a flowchart showing an operation of a passenger detection device 10 according to the second embodiment. Steps ST10 to ST18 in the flowchart shown in FIG. 10 have the same processes as those at steps ST10 to ST18 shown in the flowchart of FIG. 3.

At step ST20, an eyeglasses feature detecting unit 15a receives, through the control unit 11, a face image and a face detection result and detects lenses or frames of eyeglasses worn by the passenger from within a face detection frame in the face image.

Then, the eyeglasses feature detecting unit 15a detects shapes of the lenses or frames of the eyeglasses as feature information indicating the shape of the eyeglasses which corresponds to the face orientation of the passenger, and outputs the detection result to the control unit 11. For detection of shapes of the lenses or frames, the eyeglasses feature detecting unit 15a may perform edge detection within the lenses or frames in the face image or may perform a comparison among luminance values.

In the following, description is made using the shapes of left and right lenses as an example of eyeglasses feature information.

FIG. 11 is a diagram for explaining the shapes of left and right lenses. The eyeglasses feature detecting unit 15a calculates a circumscribed quadrilateral M1 of a right lens of the passenger and detects the lens heights N1 and N2 of the circumscribed quadrilateral M1. Likewise, the eyeglasses feature detecting unit 15a calculates a circumscribed quadrilateral M2 of a left lens and detects the lens heights N3 and N4 of the circumscribed quadrilateral M2. The lens heights N1, N2, N3, and N4 are outputted to the control unit 11 as the shapes of the left and right lenses. Note that the height direction of a lens is the vertical direction (y-axis direction) in FIG. 2A and the width direction of the lens is the horizontal direction (x-axis direction).

At step ST21, a face orientation detecting unit 17a determines whether the shapes of the left and right lenses when the passenger orients his/her face toward the irradiating unit 1, i.e., when the horizontal angle of the face orientation is 0 degree and the vertical angle of the face orientation is 0 degree, are stored in a forward-looking data storage unit 20. The shapes of the left and right lenses for this time are called forward-looking data.

If the forward-looking data is stored in the forward-looking data storage unit 20 ("YES" at step ST21), the face orientation detecting unit 17a proceeds to step ST22, and if the forward-looking data is not stored in the forward-looking data storage unit 20 ("NO" at step ST21), the face orientation detecting unit 17a proceeds to step ST14.

At step ST22, the face orientation detecting unit 17a receives, through the control unit 11, the detection results of the shapes of the left and right lenses, and compares the shapes of the left and right lenses with the forward-looking shapes of the left and right lenses stored in the forward-looking data storage unit 20 and thereby detects the horizontal angle and vertical angle of the face orientation of the passenger on the basis of the change in the shapes of the lenses depending on the face orientation of the passenger.

FIGS. 12A, 12B, and 12C are diagrams describing a method of detecting face orientation of the present embodiment.

For example, when the passenger orients his/her face to the direction of the irradiating unit 1, i.e., when the passenger faces forward in which the face orientation is as follows: the horizontal angle is 0 degree and the vertical angle is 0 degree, as shown in FIG. 12A, the ratio between lens heights is (N1:N4)=(1:1).

When the passenger orients his/her face rightward with maintaining its vertical angle to be at 0 degree, i.e., when the rightward angle of the face orientation is 30 to 60 degrees and the vertical angle of the face orientation is 0 degree, as shown in FIG. 12B, the ratio between lens heights is (N1:N4)=(10:13), for example, in which N4 is larger than N1. On the other hand, when the passenger orients his/her face leftward, i.e., when the leftward angle of the face orientation is 30 to 60 degrees and the vertical angle of the face orientation is 0 degree, the ratio between lens heights is (N1:N4)=(13:10), for example, in which N4 is smaller than N1.

When the passenger orients his/her face upward with maintaining its horizontal angle to be at 0 degree, i.e., for example, when the horizontal angle of the face orientation is 0 degree and the upward angle of the face orientation is 30 degrees, as shown in FIG. 12C, the lens height N1' is smaller than the lens height N1 when the passenger faces forward. In addition, when the passenger orients his/her face upward, the position at which the height N1' is detected is an upper position than a position at which the lens height N1 is detected when the passenger faces forward. The vertical angle of the face orientation can be calculated geometrically using the distance from the irradiating unit 1 to the passenger and the positions at which the lens heights N1 and N1' are detected, for example.

On the other hand, when the passenger orients his/her face downward with maintaining its horizontal angle to be at 0 degree, i.e., for example, when the horizontal angle of the face orientation is 0 degree and the downward angle of the face orientation is 30 degrees, though not shown in the drawings, the lens height N1' is smaller than the lens height N1 when the passenger faces forward. In addition, the position at which the height N1' is detected when the passenger orients his/her face downward is a lower position than the position at which the lens height N1 is detected when the passenger faces forward.

Note that the ratios between lens heights are only examples and are not limited to the above-described values.

When the passenger orients his/her face toward the irradiating unit 1, i.e., when the horizontal angle of the face orientation is 0 degree and the vertical angle of the face orientation is 0 degree ("YES" at step ST16), the face orientation detecting unit 17a proceeds to step ST17 and detects the inclination angle of the face orientation.

At subsequent step ST23, the face orientation detecting unit 17a stores, as forward-looking data, the shapes of the left and right lenses detected by the eyeglasses feature detecting unit 15a at step ST20 in the forward-looking data storage unit 20.

On the other hand, when the passenger does not orient his/her face toward the irradiating unit 1, i.e., when the horizontal angle of the face orientation is other than 0 degree or the vertical angle of the face orientation is other than 0 degree ("NO" at step ST16), the face orientation detecting unit 17a skips steps ST17 and ST23.

As described above, according to the second embodiment, the eyeglasses feature detecting unit 15a detects shapes of lenses or frames as the feature information of the eyeglasses, and the face orientation detecting unit 17a detects face orientation of the passenger on a basis of a change in the shapes of lenses or frames which corresponds to face orientation of the passenger, the shapes of lenses or frames being detected by the eyeglasses feature detecting unit 15a. According to this configuration, since outside light is not used, the face orientation of the passenger can always be detected without being affected by time, weather, and the like. In addition, since there is no need to perform high-precision image processing for extracting vehicle body structures reflected on eyeglasses lenses like a conventional case, a high-quality camera is not required so that the face orientation can be detected at low cost.

Further, in the case of the configuration of the second embodiment, the detection accuracy of an angle may be decreased, particularly when the passenger's face is directed upward or downward, as shown in FIGS. 12A to 12C. Hence, to improve the detection accuracy of a face orientation angle, the configurations of the first and second embodiments may be combined to each other.

For example, the face orientation detecting unit 17a performs both of face orientation detection that uses the positions of the center points of lenses and face orientation detection that uses the shapes of the lenses or frames. Then, the face orientation detecting unit 17a outputs, as a face orientation angle, a weighted average calculated by giving a weight of "8" for the face orientation angle that uses the positions of the center points of the lenses, and giving a weight of "2" for the face orientation angle that uses the shapes of the lenses or frames. Note that the weight ratio is not limited to these examples.

In addition, when the reliability of detection of lenses or frames by the eyeglasses feature detecting unit 15a is decreased to be lower than a threshold value, the face orientation detecting unit 17a may reduce the weight of the face orientation angle that uses the shapes of the lenses or frames.

By using not only the positions of the center points of lenses but also the shapes of the lenses or frames, the influence due to differences in shape between eyeglasses is reduced and it is possible to correspond to eyeglasses of various shapes. In addition, since both of face orientation detection that uses the positions of the center points of the lenses and face orientation detection that uses the shapes of the lenses or frames are used, the detection accuracy of a face orientation angle is improved compared to the case of using only the shapes of the lenses or frames.

Third Embodiment

In this third embodiment, to improve the detection accuracy of the face orientation angle, relation between the shapes of lenses or frames and face orientation of a passenger is learned using the positions of the center points of eyeglasses lenses.

Figure 13:
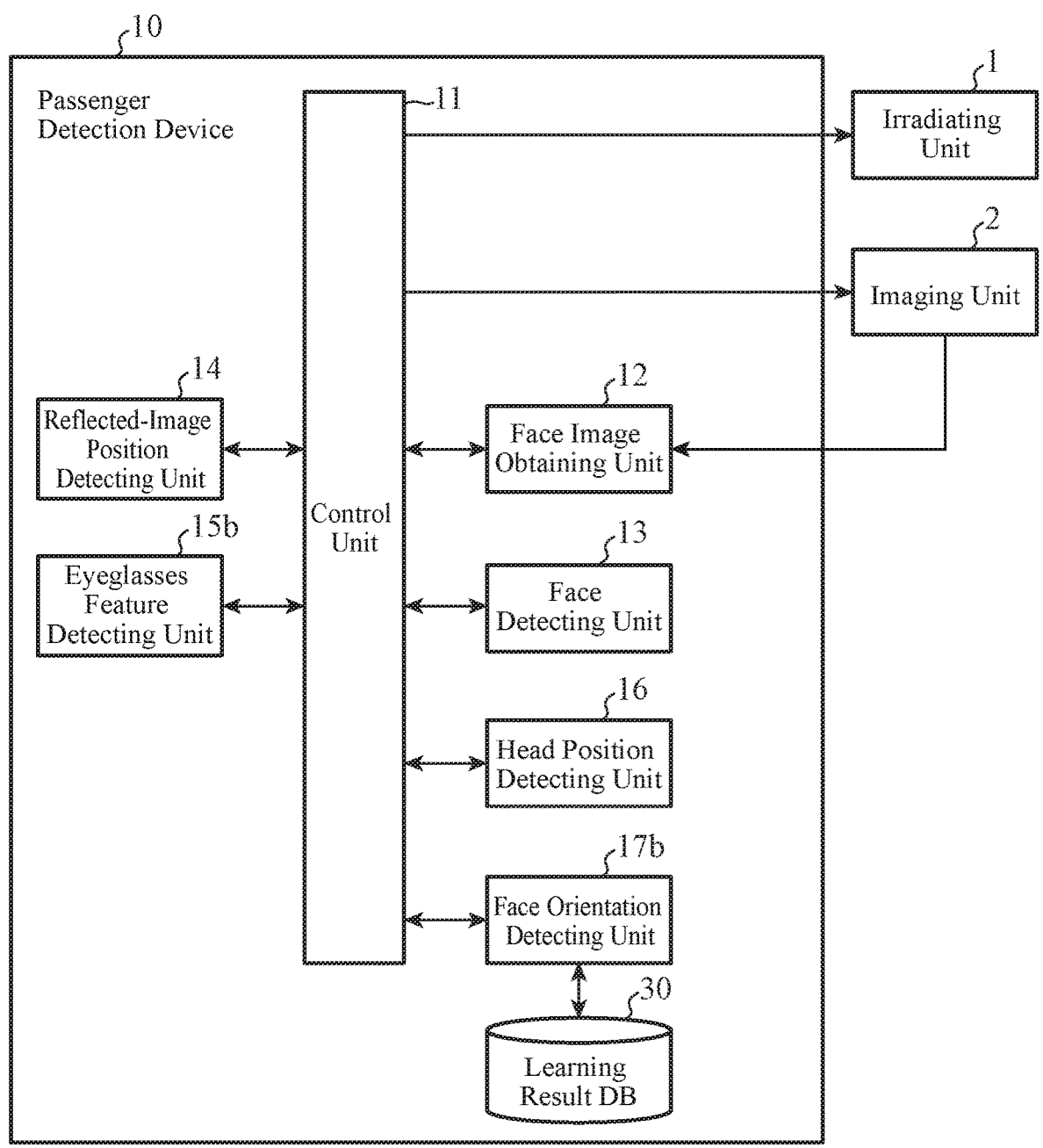
FIG. 13 is a block diagram showing an exemplary configuration of a passenger detection system according to a third embodiment of the invention.

FIG. 13 is a block diagram showing an exemplary configuration of a passenger detection system according to the third embodiment of the invention. In FIG. 13, the same or corresponding portions to those in FIG. 1 are denoted by the same reference signs and description thereof is omitted.

Figure 14:
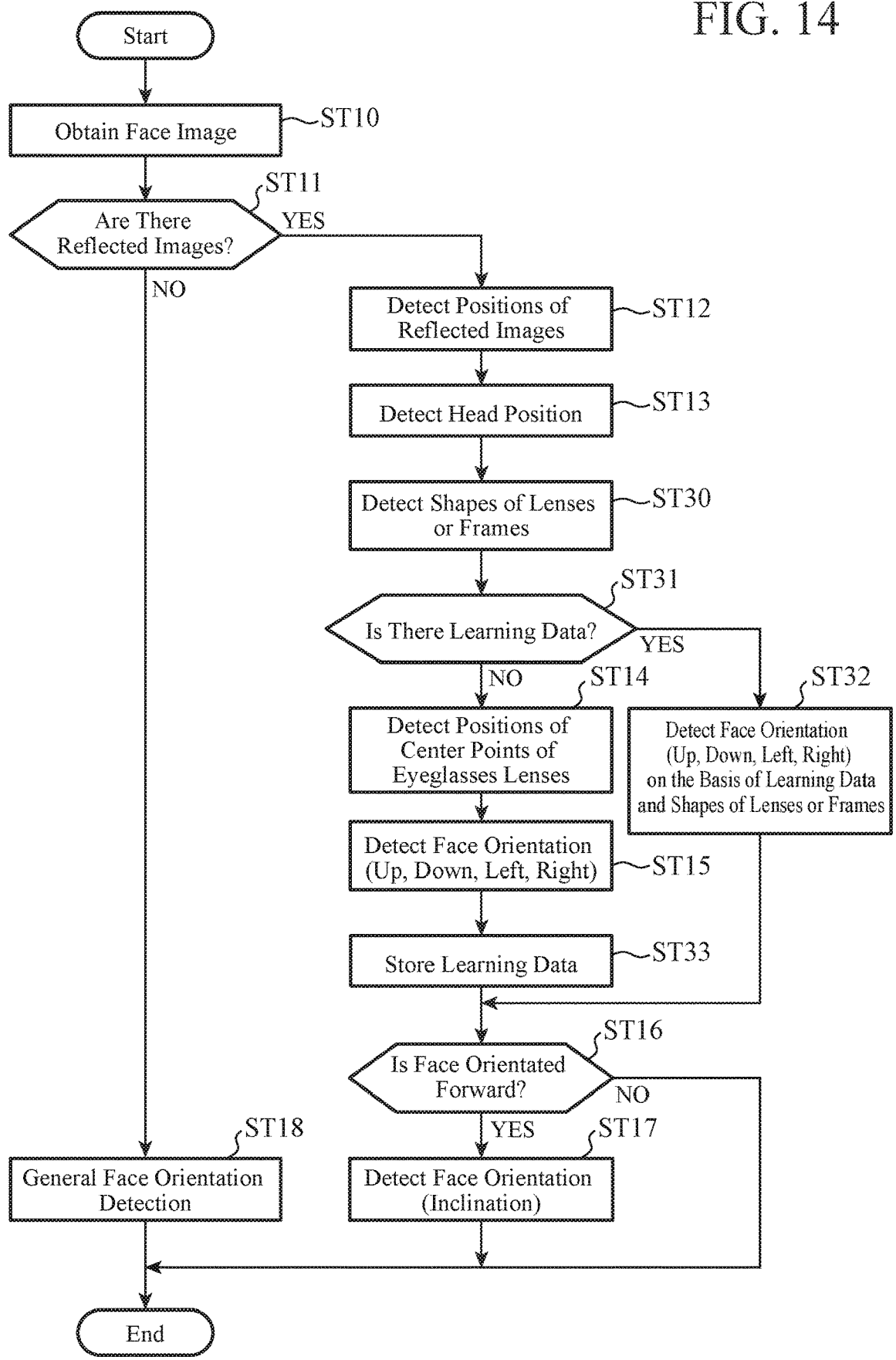
FIG. 14 is a flowchart showing an operation of a passenger detection device according to the third embodiment.

FIG. 14 is a flowchart showing an operation of a passenger detection device 10 according to the third embodiment. Steps ST10 to ST18 in the flowchart shown in FIG. 14 are the same processes as those at steps ST10 to ST18 shown in the flowchart of FIG. 3.

At step ST30, an eyeglasses feature detecting unit 15b receives, through the control unit 11, a face image and a face detection result and detects lenses or frames worn by the passenger from within a face detection frame in the face image. Then, the eyeglasses feature detecting unit 15b detects, as shown in FIG. 11, shapes of the lenses or frames of the eyeglasses as eyeglasses feature information, and outputs the detection results to the control unit 11.

In the following, description is made using an example case in which the eyeglasses feature information indicates the shapes of left and right lenses.

At step ST31, a face orientation detecting unit 17b determines whether learning data is stored in a learning result database (DB) 30. The learning data will be described later.

If sufficient learning data is stored in the learning result DB 30 ("YES" at step ST31), the face orientation detecting unit 17b proceeds to step ST32, and if sufficient learning data is not stored in the learning result DB 30 ("NO" at step ST31), the face orientation detecting unit 17b proceeds to step ST14. The sufficient learning data as mentioned herein refers to data which allows to interpolate the horizontal angle and vertical angle of the face orientation corresponding to the shapes of the left and right lenses that are not stored as learning data at step ST32 described later.

At step ST33, the face orientation detecting unit 17b generates learning data, in which the horizontal angle and vertical angle of the face orientation detected at step ST15 and the shapes of the left and right lenses detected at step ST30 are associated with one another, and stores the learning data in the learning result DB 30.

At step ST32, the face orientation detecting unit 17b detects the horizontal angle and vertical angle of the face orientation corresponding to the shapes of the left and right lenses detected at step ST30, using the learning data stored in the learning result DB 30, and outputs the detection results to the control unit 11. At this time, the face orientation detecting unit 17b may interpolate the horizontal angle and vertical angle of the face orientation corresponding to the shapes of the left and right lenses that are not stored as learning data, using the horizontal angle and vertical angle of the face orientation corresponding to the shapes of the left and right lenses that are stored as learning data.

By the above, according to the third embodiment, the eyeglasses feature detecting unit 15b detects positions of center points of lenses and shapes of the lenses or frames as the feature information of the eyeglasses, and the face orientation detecting unit 17b detects face orientation of the passenger on a basis of relation among the head position of the passenger detected by the head position detecting unit 16, the positions of respective reflected images detected by the reflected-image position detecting unit 14, and the positions of center points of lenses detected by the eyeglasses feature detecting unit 15b, and performs learning, using the detected face orientation, relation between the shapes of the lenses or frames detected by the eyeglasses feature detecting unit 15b and the face orientation of the passenger.

Then, the face orientation detecting unit 17b is configured to detect, using the learned data, face orientation corresponding to the shapes of the lenses or frames detected by the eyeglasses feature detecting unit 15b. According to this configuration, since outside light is not used, the face orientation of the passenger can always be detected without being affected by time, weather, and the like. In addition, since there is no need to perform high-precision image processing for extracting vehicle body structures reflected on eyeglasses lenses like the conventional case, a high-quality camera is not required, so that the face orientation can be detected at low cost. Furthermore, since relation between the shapes of lenses or frames and the face orientation is learned, the detection accuracy of the face orientation angle is improved compared to the second embodiment.

Fourth Embodiment

In this fourth embodiment, the shapes of temples placed over ears are detected as eyeglasses feature information.

Figure 15:
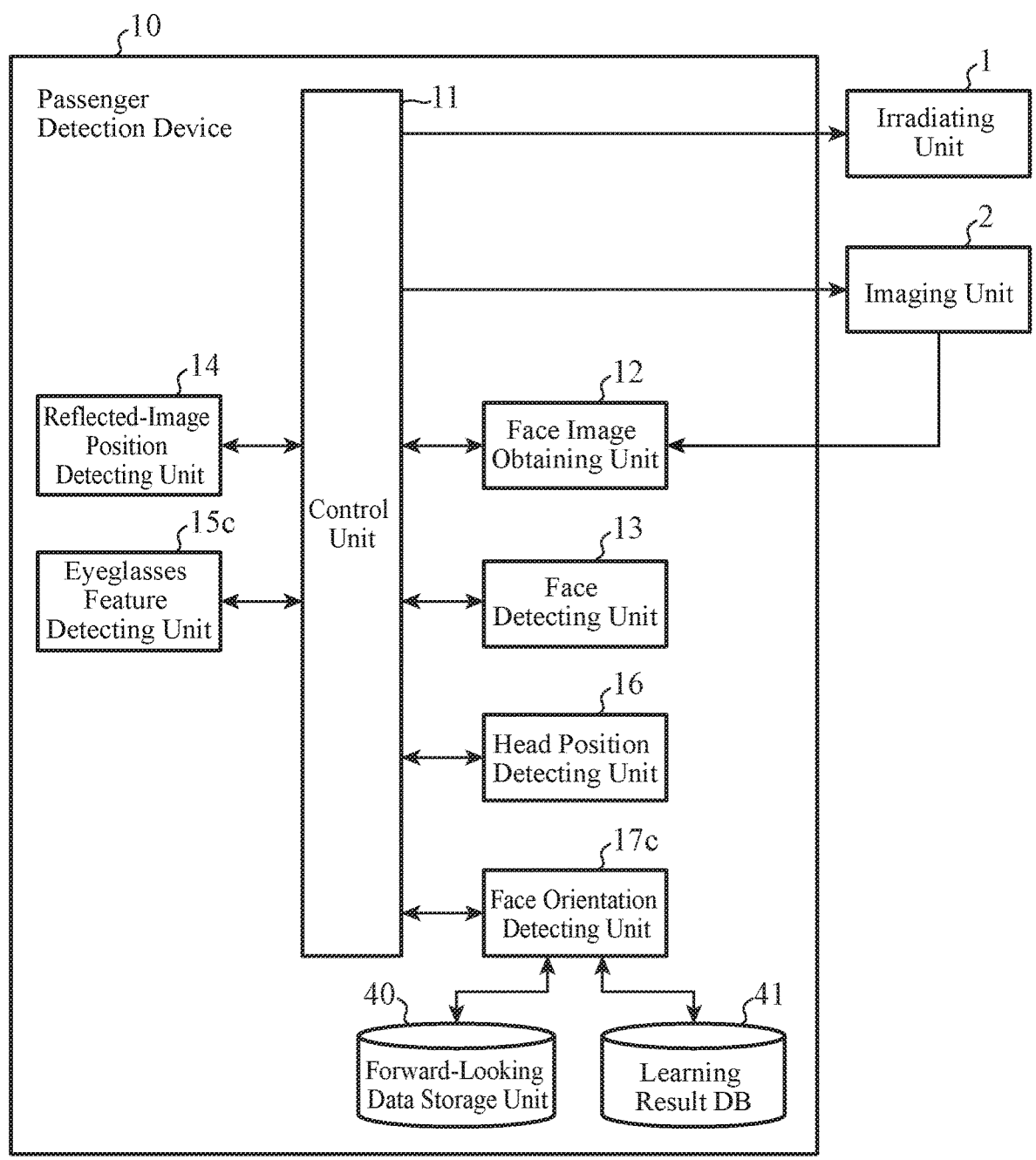
FIG. 15 is a block diagram showing an exemplary configuration of a passenger detection system according to a fourth embodiment of the invention.

FIG. 15 is a block diagram showing an exemplary configuration of a passenger detection system according to the fourth embodiment of the invention. In FIG. 15, the same or corresponding portions to those in FIG. 1 are denoted by the same reference signs and description thereof is omitted.

Figure 16:
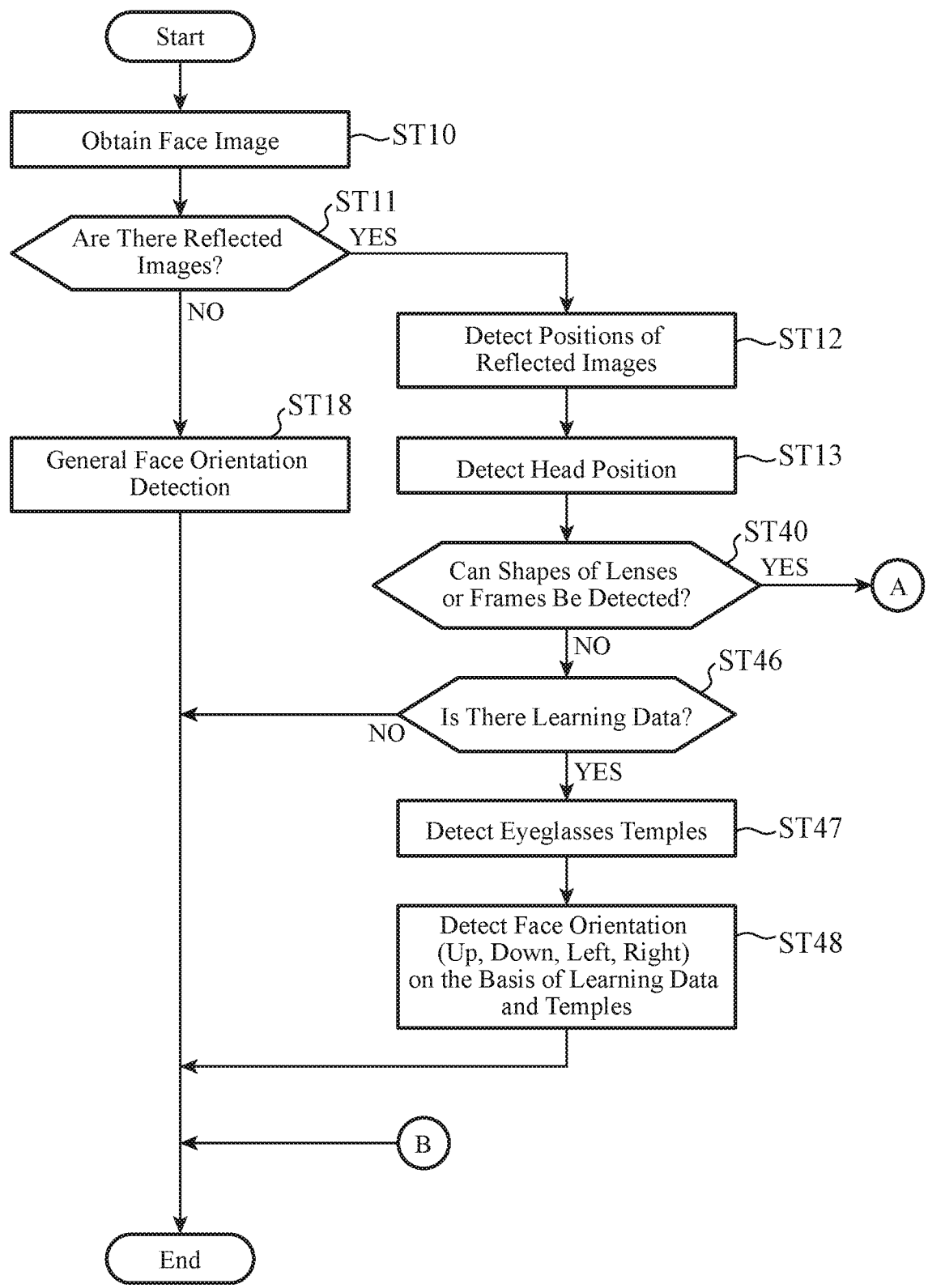
FIG. 16 is a flowchart showing an operation of a passenger detection device according to the fourth embodiment.
Figure 17:
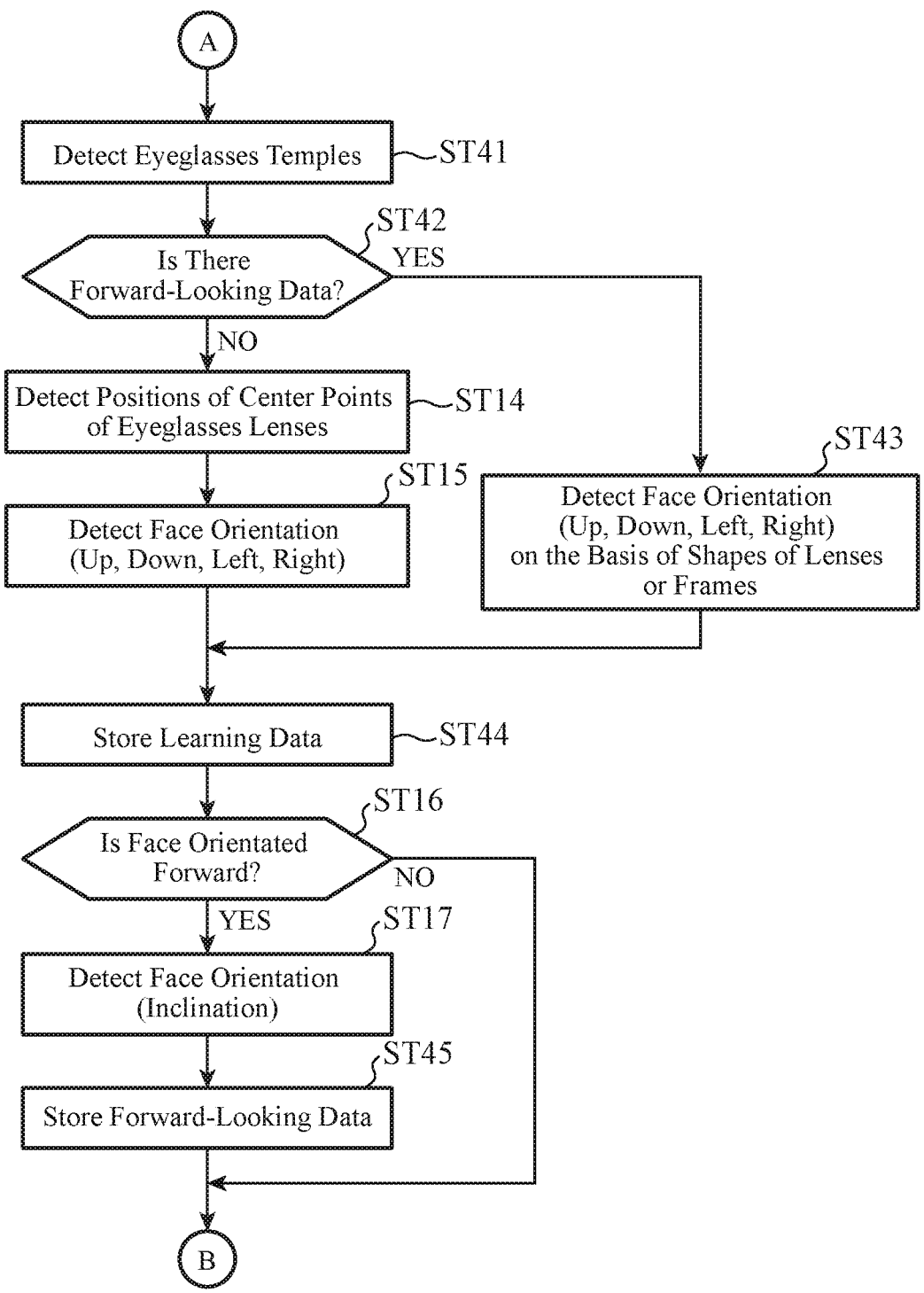
FIG. 17 shows the continuation of the flowchart shown in FIG. 16.

FIGS. 16 and 17 are flowcharts showing an operation of a passenger detection device 10 according to the fourth embodiment. Steps ST10 to ST18 in the flowcharts shown in FIGS. 16 and 17 have the same processes as those at steps ST10 to ST18 shown in the flowchart of FIG. 3.

As shown in FIG. 6, when a passenger orients his/her face rightward or leftward by a large angle as viewed from the side where the irradiating unit 1 and the imaging unit 2 are installed, the length of an eyeglasses temple increases, and when the passenger orients his/her face forward, the length of the eyeglasses temple decrease.

In addition, when the passenger orients his/her face upward or downward by a large angle, the orientation of the eyeglasses temples becomes upward or downward, and when the passenger orients his/her face forward, the orientation of the eyeglasses temples becomes horizontal.

Thus, the horizontal angle of the face orientation of the passenger can be detected on the basis of the lengths of the eyeglasses temples, and the vertical angle of the face orientation of the passenger can be detected on the basis of the orientation of the eyeglasses temples.

At step ST40, an eyeglasses feature detecting unit 15c receives, through the control unit 11, a face image and a face detection result and detects lenses or frames worn by the passenger from within the face detection frame in the face image. Then, the eyeglasses feature detecting unit 15b detects, as shown in FIG. 11, shapes of the lenses or frames as feature information indicating the shape of eyeglasses which corresponds to the face orientation of the passenger, and outputs the feature information to the control unit 11.

In the following, an example in which eyeglasses feature information indicates the lens heights and lens widths which show the shapes of the left and right lenses is described. The lens heights are four sides (N1, N2, N3, and N4) extending in the vertical direction of the circumscribed quadrilaterals M1 and M2 in FIG. 11, and the lens widths are four sides extending in the horizontal direction of the circumscribed quadrilaterals M1 and M2.

If the eyeglasses feature detecting unit 15c can detect the lens heights and lens widths of the left and right lenses ("YES" at step ST40), the eyeglasses feature detecting unit 15c proceeds to step ST41, and if the eyeglasses feature detecting unit 15c cannot detect any of the lens heights and lens widths ("NO" at step ST40), the eyeglasses feature detecting unit 15c proceeds to step ST46. When, for example, the passenger orients his/her face leftward or rightward by a large angle, any of the lens heights and lens widths of the left and right lenses may not be able to be detected. If any of the lens heights and lens widths of the left and right lenses cannot be detected, then the positions of the center points of the lenses cannot also be detected. In the present embodiment, even in such a case, by steps ST46 to ST48 which will be described later, the face orientation can be detected using detection results of eyeglasses temples.

At step ST41, the eyeglasses feature detecting unit 15c detects the lengths and orientation of the temples of the eyeglasses worn by the passenger from within the face detection frame in the face image, and outputs the detection results as eyeglasses feature information to the control unit 11. To detect the eyeglasses temples, the eyeglasses feature detecting unit 15c may perform edge detection in the vicinity of the lenses or frames in the face image or may perform a comparison among luminance values.

At step ST42, a face orientation detecting unit 17c determines whether forward-looking data is stored in the forward-looking data storage unit 40. The forward-looking data shows the shapes of the left and right lenses when the passenger orients his/her face toward the irradiating unit 1, i.e., when the horizontal angle of the face orientation is 0 degree and the vertical angle of the face orientation is 0 degree.

If the forward-looking data is stored in the forward-looking data storage unit 40 ("YES" at step ST42), the face orientation detecting unit 17c proceeds to step ST43, and if the forward-looking data is not stored in the forward-looking data storage unit 40 ("NO" at step ST42), the face orientation detecting unit 17c proceeds to step ST14.

At step ST43, the face orientation detecting unit 17c receives, through the control unit 11, the detection results of the shapes of the left and right lenses, and compares the shapes of the left and right lenses with the forward-looking shapes of the left and right lenses stored in the forward-looking data storage unit 40 and thereby detects the horizontal angle and vertical angle of the face orientation of the passenger on the basis of the change in the shapes depending on the face orientation of the passenger.

At step ST44, the face orientation detecting unit 17c generates learning data in which the horizontal angle and vertical angle of the face orientation detected at step ST15 or step ST43 and the detection results of the eyeglasses temples detected at step ST41 are associated with one another, and stores the learning data in a learning result DB 41.

At step ST45, the face orientation detecting unit 17c stores the shapes of the left and right lenses when the passenger orients his/her face toward the side of the irradiating unit 1, i.e., when the horizontal angle of the face orientation is 0 degree and the vertical angle of the face orientation is 0 degree, in the forward-looking data storage unit 40 as forward-looking data.

At step ST46, the face orientation detecting unit 17c determines whether learning data is stored in the learning result DB 41. If sufficient learning data is stored in the learning result DB 41 ("YES" at step ST46), the face orientation detecting unit 17c proceeds to step ST47, and if sufficient learning data is not stored in the learning result DB 41 ("NO" at step ST46), the face orientation detecting unit 17c ends the process.

At step ST47, the face orientation detecting unit 17c detects eyeglasses temples similarly to the process in step ST41.

At step ST48, the face orientation detecting unit 17c detects, using the learning data stored in the learning result DB 41, the horizontal angle and vertical angle of the face orientation corresponding to the lengths and orientation of the eyeglasses temples detected at step ST47, and outputs the detection results to the control unit 11. At this time, the face orientation detecting unit 17c may interpolate the horizontal angle and vertical angle of the face orientation corresponding to the lengths and orientations of the eyeglasses temples that are not stored as learning data, using the horizontal angle and vertical angle of the face orientation corresponding to the lengths and orientations of the eyeglasses temples that are stored as learning data.

Note that although in the example of FIGS. 16 and 17 the face orientation detecting unit 17c learns relation between the shapes of eyeglasses temples and face orientation using both of the shapes of lenses or frames and the positions of the center points of the lenses, the face orientation detecting unit 17c may perform learning using only one of them.

By the above, according to the fourth embodiment, the eyeglasses feature detecting unit 15c detects, as the feature information of the eyeglasses, shapes of temples placed over ears, and at least either one of shapes of lenses or frames and positions of center points of the lenses. The face orientation detecting unit 17c detects face orientation of the passenger on a basis of the shapes of lenses or frames detected by the eyeglasses feature detecting unit 15c, or detects face orientation of the passenger on a basis of relation among the head position of the passenger detected by the head position detecting unit 16, the positions of respective reflected images detected by the reflected-image position detecting unit 14, and the positions of center points of the lenses detected by the eyeglasses feature detecting unit 15c, and performs learning, using the detected face orientation of the passenger, relation between the shapes of temples detected by the eyeglasses feature detecting unit 15c and the face orientation. The face orientation detecting unit 17c detects, using the data obtained by the learning, the face orientation corresponding to the shapes of temples detected by the eyeglasses feature detecting unit 15c. By this configuration, even when a part of the shapes of lenses or frames or the positions of respective reflected images cannot be detected, face orientation detection that uses the shapes of the temples can be performed on the basis of learning results. Therefore, a large face orientation angle that is difficult to detect with high accuracy in the above-described first and second embodiments can also be accurately detected.

Figure 18:
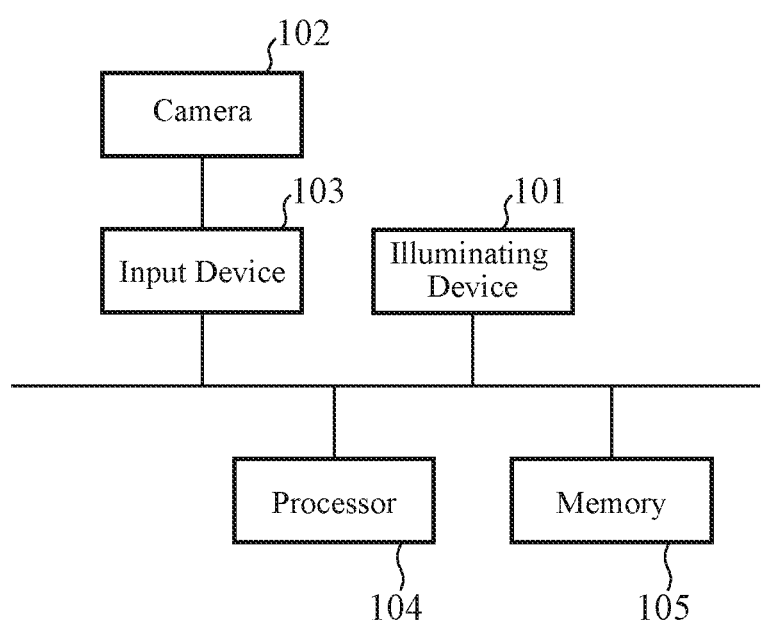
FIG. 18 is a hardware configuration diagram of the passenger detection system according to each embodiment of the invention.

Finally, with reference to FIG. 18, an exemplary hardware configuration of the passenger detection system according to the respective embodiments of the invention will be described.

The irradiating unit 1 in the passenger detection system is an illuminating device 101 including a plurality of light sources. The imaging unit 2 in the passenger detection system is a camera 102. The face image obtaining unit 12 in the passenger detection device 10 is an input device 103 that is connected to the camera 102 and that obtains a face image from the camera 102 for inputting the face image to the passenger detection device 10. The control unit 11, the face detecting unit 13, the reflected-image position detecting unit 14, the eyeglasses feature detecting unit 15, 15a to 15c, the head position detecting unit 16, and the face orientation detecting unit 17, 17a to 17c in the passenger detection device 10 are a processor 104 that executes programs stored in a memory 105. The forward-looking data storage unit 20, 40 and the learning result DB 30, 41 in the passenger detection device 10 are the memory 105.

The functions of the control unit 11, the face detecting unit 13, the reflected-image position detecting unit 14, the eyeglasses feature detecting unit 15, 15a to 15c, the head position detecting unit 16, and the face orientation detecting unit 17, 17a to 17c are implemented by software, firmware, or a combination of software and firmware. The software or firmware is described as a program and stored in the memory 105. The processor 104 implements the function of each unit by reading out and executing a program stored in the memory 105. Namely, the passenger detection device 10 includes the memory 105 for storing programs by which each step shown in FIG. 3, 10, 14, 16, or 17 is consequently performed when the programs are executed by the processor 104. It can also be said that the programs causes a computer to perform procedures or methods performed by the respective units of the passenger detection device 10.

The processor 104 is also called a central processing unit (CPU), a processing device, an arithmetic device, a microprocessor, a microcomputer, a digital signal processor (DSP), or the like. The memory 105 may be, for example, a nonvolatile or volatile semiconductor memory such as a random access memory (RAM), a read only memory (ROM), a flash memory, an erasable programmable ROM (EPROM), or an electrically EPROM (EEPROM), or may be a magnetic disc such as a hard disc or a flexible disc, or an optical disc such as a MiniDisc, a compact disc (CD), or a digital versatile disc (DVD).

Note that, in the present invention, a free combination of the embodiments, modifications of any component of the embodiments, or omissions of any component of the embodiments are possible within the scope of the invention.

INDUSTRIAL APPLICABILITY

A passenger detection device according to the invention detects a face orientation of a passenger in a vehicle using a face image which is captured in a state in which the passenger is irradiated with irradiation light from a plurality of light sources, and thus, is suitable for use as, for example, a passenger detection device for vehicles such as automobiles, railway vehicles, ships, or aircrafts.

REFERENCE SIGNS LIST

1: Irradiating unit, 2: Imaging unit, 10: Passenger detection device, 11: Control unit, 12: Face image obtaining unit, 13: Face detecting unit, 14: Reflected-image position detecting unit, 15 and 15a to 15c: Eyeglasses feature detecting unit, 16: Head position detecting unit, 17 and 17a to 17c: Face orientation detecting unit, 20 and 40: Forward-looking data storage unit, 30 and 41: Learning result DB, 101: Illuminating device, 102: Camera, 103: Input device, 104: Processor, and 105: Memory

The invention claimed is:
1. A passenger detection device comprising:
a face image obtaining unit obtaining a face image of a passenger in a vehicle, the face image being captured in a state in which the passenger is irradiated with irradiation light from a plurality of light sources;
a reflected-image position detecting unit detecting positions of respective reflected images of the plurality of light sources from the face image obtained by the face image obtaining unit, the reflected images being reflected on eyeglasses worn by the passenger;

an eyeglasses feature detecting unit detecting, from the face image obtained by the face image obtaining unit, feature information indicating a position or shape of the eyeglasses which corresponds to face orientation of the passenger;

a head position detecting unit detecting a head position of the passenger on a basis of the positions of respective reflected images detected by the reflected-image position detecting unit; and a face orientation detecting unit detecting face orientation of the passenger on a basis of the head position of the passenger detected by the head position detecting unit, the positions of respective reflected images detected by the reflected-image position detecting unit, and the feature information of the eyeglasses detected by the eyeglasses feature detecting unit.

2. The passenger detection device according to claim 1, wherein the eyeglasses feature detecting unit detects positions of center points of lenses as the feature information of the eyeglasses, and the face orientation detecting unit detects face orientation of the passenger on a basis of relation among the head position of the passenger detected by the head position detecting unit, the positions of respective reflected images detected by the reflected-image position detecting unit, and the positions of center points of lenses detected by the eyeglasses feature detecting unit.

3. The passenger detection device according to claim 1, wherein the eyeglasses feature detecting unit detects shapes of lenses or frames as the feature information of the eyeglasses, and the face orientation detecting unit detects face orientation of the passenger on a basis of a change in the shapes of lenses or frames which corresponds to face orientation of the passenger, the shapes of lenses or frames being detected by the eyeglasses feature detecting unit.

4. The passenger detection device according to claim 1, wherein the eyeglasses feature detecting unit detects positions of center points of lenses and shapes of the lenses or frames as the feature information of the eyeglasses, and the face orientation detecting unit detects face orientation of the passenger on a basis of relation among the head position of the passenger detected by the head position detecting unit, the positions of respective reflected images detected by the reflected-image position detecting unit, and the positions of center points of lenses detected by the eyeglasses feature detecting unit, and performs learning, using the detected face orientation of the passenger, relation between the shapes of the lenses or frames detected by the eyeglasses feature detecting unit and the face orientation.

5. The passenger detection device according to claim 4, wherein the face orientation detecting unit detects, using the data obtained by the learning, the face orientation corresponding to the shapes of the lenses or frames detected by the eyeglasses feature detecting unit.

6. The passenger detection device according to claim 1, wherein the eyeglasses feature detecting unit detects, as the feature information of the eyeglasses, shapes of temples placed over ears, and at least either one of shapes of lenses or frames and positions of center points of the lenses, and the face orientation detecting unit detects face orientation of the passenger on a basis of the shapes of lenses or frames detected by the eyeglasses feature detecting unit, or detects face orientation of the passenger on a basis of relation among the head position of the passenger detected by the head position detecting unit, the positions of respective reflected images detected by the reflected-image position detecting unit, and the positions of center points of the lenses detected by the eyeglasses feature detecting unit, and performs learning, using the detected face orientation of the passenger, relation between the shapes of temples detected by the eyeglasses feature detecting unit and the face orientation.

7. The passenger detection device according to claim 6, wherein the face orientation detecting unit detects, using the data obtained by the learning, the face orientation corresponding to the shapes of temples detected by the eyeglasses feature detecting unit.

8. A passenger detection system comprising:

an irradiating unit irradiating a passenger in a vehicle with irradiation light from a plurality of light sources;

an imaging unit capturing an image of the passenger being irradiated with the irradiation light from the irradiating unit;

a face image obtaining unit obtaining a face image of the passenger captured by the imaging unit;

a reflected-image position detecting unit detecting positions of respective reflected images of the plurality of light sources from the face image obtained by the face image obtaining unit, the reflected images being reflected on eyeglasses worn by the passenger;

an eyeglasses feature detecting unit detecting, from the face image obtained by the face image obtaining unit, feature information indicating a position or shape of the eyeglasses which corresponds to face orientation of the passenger;

a head position detecting unit detecting a head position of the passenger on a basis of the positions of respective reflected images detected by the reflected-image position detecting unit; and a face orientation detecting unit detecting face orientation of the passenger on a basis of the head position of the passenger detected by the head position detecting unit, the positions of respective reflected images detected by the reflected-image position detecting unit, and the feature information of the eyeglasses detected by the eyeglasses feature detecting unit.

9. The passenger detection system according to claim 8, wherein the irradiating unit has a plurality of light sources arranged to form any of vertical, horizontal, and oblique lines.

10. A passenger detection method comprising the steps of:

obtaining, by a face image obtaining unit, a face image of a passenger in a vehicle, the face image being captured in a state in which the passenger is irradiated with irradiation light from a plurality of light sources;

detecting, by a reflected-image position detecting unit, positions of respective reflected images of the plurality of light sources from the face image obtained by the face image obtaining unit, the reflected images being reflected on eyeglasses worn by the passenger;

detecting, by an eyeglasses feature detecting unit, feature information indicating a position or shape of the eyeglasses which corresponds to face orientation of the passenger, from the face image obtained by the face image obtaining unit;

detecting, by a head position detecting unit, a head position of the passenger on a basis of the positions of respective reflected images detected by the reflected-image position detecting unit; and detecting, by a face orientation detecting unit, face orientation of the passenger on a basis of the head position of the passenger detected by the head position detecting unit, the positions of respective reflected images detected by the reflected-image position detecting unit, and the feature information of the eyeglasses detected by the eyeglasses feature detecting unit.

* * * * *